(12) United States Patent
Imbierski

(10) Patent No.: US 10,261,896 B2
(45) Date of Patent: Apr. 16, 2019

(54) SELF TUNING ADAPTIVE BUCKET MEMORY MANAGER

(71) Applicant: SAP SE, Walldorf (DE)

(72) Inventor: Tony Imbierski, Basingstoke (GB)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/166,748

(22) Filed: Oct. 22, 2018

(65) Prior Publication Data

US 2019/0057022 A1   Feb. 21, 2019

Related U.S. Application Data

(63) Continuation of application No. 15/238,254, filed on Aug. 16, 2016, now Pat. No. 10,133,661.

(51) Int. Cl.
*G06F 12/00* (2006.01)
*G06F 12/02* (2006.01)
*G06F 3/06* (2006.01)

(52) U.S. Cl.
CPC ............ *G06F 12/023* (2013.01); *G06F 3/061* (2013.01); *G06F 3/064* (2013.01); *G06F 3/0631* (2013.01); *G06F 3/0644* (2013.01); *G06F 3/0673* (2013.01); *G06F 2212/1016* (2013.01); *G06F 2212/1024* (2013.01); *G06F 2212/154* (2013.01); *G06F 2212/163* (2013.01)

(58) Field of Classification Search
CPC ...... G06F 12/023; G06F 3/061; G06F 3/0631; G06F 3/064; G06F 3/0644; G06F 3/0673; G06F 2212/1016; G06F 2212/1024; G06F 2212/154; G06F 2212/163
See application file for complete search history.

(56) References Cited

U.S. PATENT DOCUMENTS

2014/0019707 A1*   1/2014   Benhase ............... G06F 12/023
                                                                  711/171

* cited by examiner

*Primary Examiner* — Shawn X Gu
(74) *Attorney, Agent, or Firm* — Sterne, Kessler, Goldstein & Fox P.L.L.C.

(57) ABSTRACT

Disclosed herein are system, method, and computer program product embodiments for adaptively self-tuning a bucket memory manager. An embodiment operates by receiving requests for memory blocks of varying memory sizes from a client. Determining a workload for the client based on the requests. Analyzing buckets in the bucket memory manager based on the workload. Adjusting parameters associated with the bucket memory manager based on the analyzing to accommodate the requests.

20 Claims, 9 Drawing Sheets

SELF TUNING ADAPTIVE BUCKET MEMORY MANAGER

CROSS-REFERENCE TO RELATED APPLICATIONS

This application is a continuation of U.S. patent application Ser. No. 15/238,254 filed on Aug. 16, 2016, now U.S. Pat. No. 10,133,661 which is incorporated herein by reference in its entirety.

BACKGROUND

Generally, in a typical computing environment, a memory manager allocates memory for various applications. The applications may request memory of varying sizes, from small chunks of memory to large chunks of memory. In return, the memory manager allocates the requested size from a block of memory and distributes the allocated memory to the application. However, there may be issues with performance in efficiently distributing memory of varying sizes. Specifically, memory managers tend to degrade the longer they run because as they allocate from the block of memory, the block of memory becomes fragmented. As a result, the memory manager may take a longer time to scan the fragmented block of memory to find a requested memory size.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for adaptively self-tuning a bucket memory manager.

Figure 1:
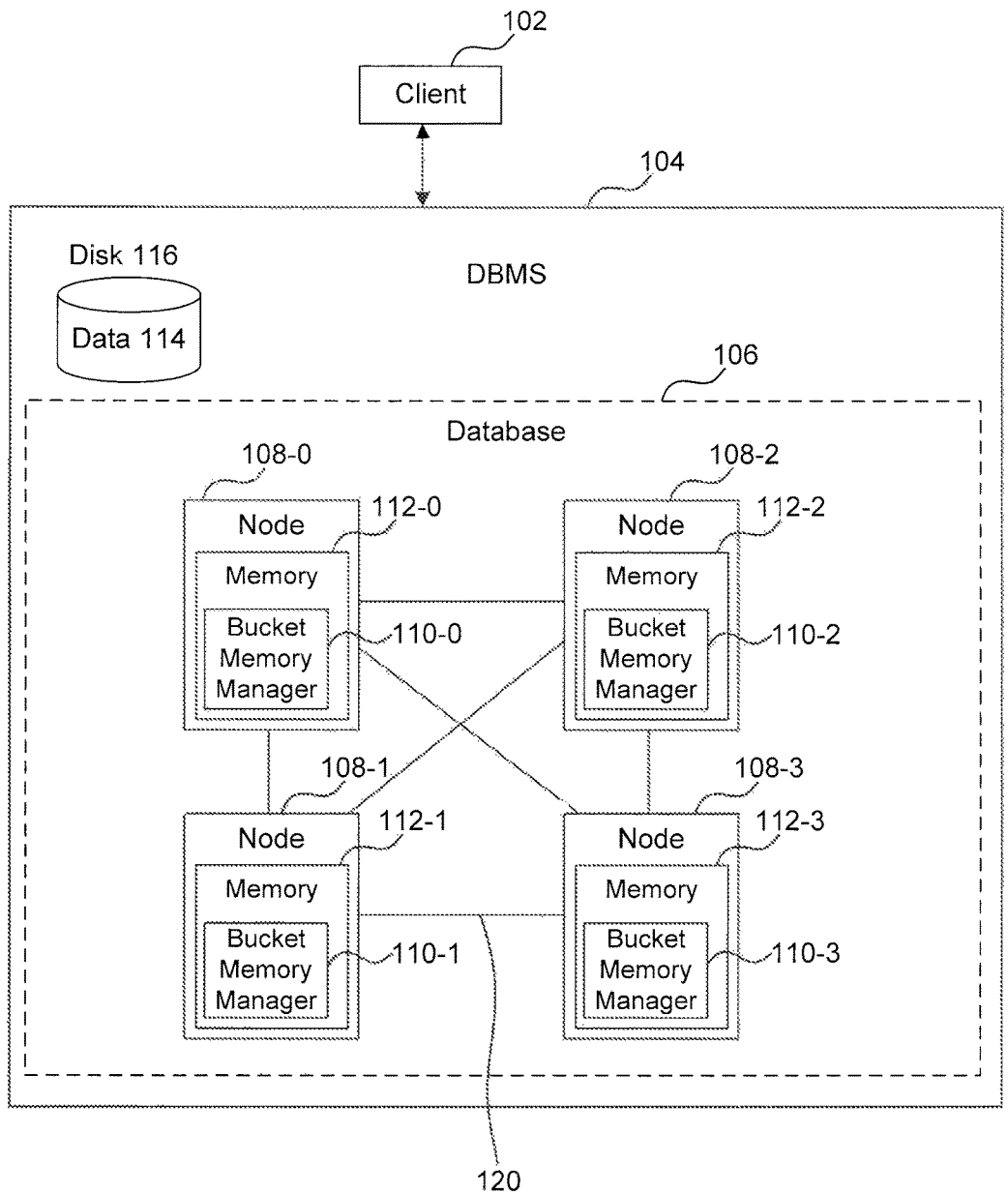
FIG. 1 is a block diagram of a distributed database system including a plurality of nodes each with a bucket memory manager, according to some embodiments.

FIG. 1 is a block diagram 100 of a client 102 interfacing with a database management system (DBMS) 104, according to an embodiment. The DBMS 104 may include a database 106 having a plurality of nodes 108. The nodes 108 of database 106 may be distributed within one or more machines or computers, over local or diverse geographic areas.

Nodes 108 may each include one or more processors, bucket memory manager 110, local memory 112, and a connection to one or more other nodes 108 of database 106. Local memory 112 may be directly accessible via a high-speed bus or other connection 120. Additionally, the nodes 108 may access the memory 112 of one or more other nodes 108 through one or more interconnects 120.

An interconnect may be a connection or communication pathway between two or more nodes 108, enabling the nodes to communicate with one another including accessing the memories 112 of other nodes 108. For example, Node 108-0 may have access to both local memory 112-0, as well as remote memory 112-1. Memory 112-1 may be considered local memory to Node 108-1, and remote memory to any other nodes 108 accessing memory 112-1, including Node 108-0. For example, remote memory 112-0 may be any memory that is accessible via a connection through one or more additional nodes 108-1, 108-2, and 108-3 other than the local node 108-0.

In an embodiment, the bucket memory manager 110, in any given node 108, may interact with other bucket memory managers 110 in other node 108 through the interconnect 120. In addition, as noted above, each bucket memory manager 110 has access to the respective local memory 112 of its own node 108 and any of the other remote memories 112 of other nodes 108. For example, bucket memory manager 110-0 may have access to bucket memory manager 110-3 and remote memory 112-3.

In an embodiment, DBMS 104 may receive a request from a client 102 for data 114. DBMS 104 may determine that data 114 does not exist within the database 106 (e.g., in the memory 112 of any of the nodes 108). DBMS 104 may then need to load data 114 from a disk 116 into one or more memories 112. Alternatively, for example, client 102 may request that data 114 be loaded into database 106 from disk 116.

Disk 116 may be a tape drive, hard drive disk, or other storage (generally referred to as secondary storage) that requires greater resources (including, but not limited to time) by which to perform data access. For example, generally, data stored in memory 112 may be accessed more quickly than data 114 when stored in disk 116.

Figure 2:
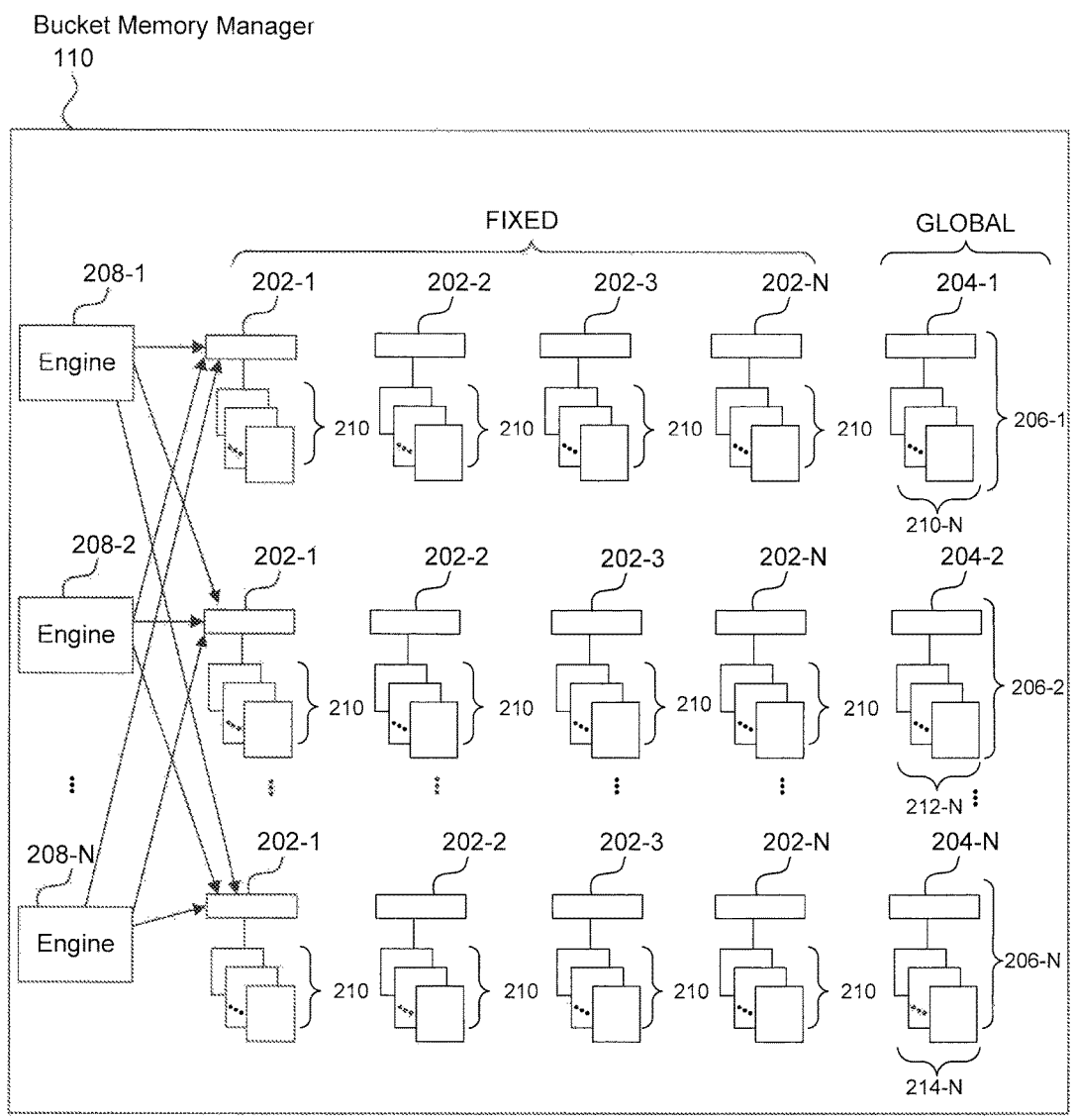
FIG. 2 is a block diagram of a bucket memory manager, according to some embodiments.

FIG. 2 is a block diagram of a bucket memory manager 110, according to an embodiment. As mentioned above, each of the nodes 108 include bucket memory manager 110. The bucket memory manager 110 interacts with the memory 112 and processes requests from clients 102 for memory blocks of particular sizes.

In an embodiment, the bucket memory manager 110 may include one or more fixed size buckets 202, one or more global buckets 204, one or more instances 206, and one or more associated engines 208. A bucket 202, 204 is a container for storing pointers to memory blocks in each of the memories 112. The fixed size buckets 202 each store pointers to memory blocks of a particular size. For example, fixed size bucket 202-1 may store pointers to one or more 1-megabyte (MB) allocations from memory 112-0 in node 108-0. In another example, bucket 202-2 may store addresses for one or more 3 MB allocation from memory 112. Each of the fixed size buckets 202-1 through 202-N are associated with memory blocks of a particular size.

In an embodiment, the global bucket 204 stores pointers to memory blocks of sizes not stored by fixed size buckets 202. For example, fixed size bucket 202-1 may store a plurality of 1 MB memory sizes, fixed size bucket 202-2 may store a plurality of 3 MB memory sizes, fixed size bucket 202-3 may store a plurality of 5 MB memory sizes, whereas global bucket 204-1 may store memory blocks of other memory sizes from memory 112. Thus, global bucket 204-1 is used to process memory requests of memory blocks not associated with the fixed size buckets 202.

Each instance 206 comprises an engine 208, one or more fixed size buckets 202, and a global bucket 204, according to an embodiment. For example, instance 206-1 comprises engine 208-1, fixed size buckets 202-1 through 202-N, and global bucket 204-1.

In an embodiment, the bucket sizes associated with the fixed size buckets 202 for the instances 206 are the same. The number of buckets 202, 204 in each of the instances 206 is the same. For example, each instance 206 has one global bucket 204, one engine 208 and N number of fixed sizes buckets 202. The fixed size buckets 202 across each of the instances 206 store pointers to memory blocks of the same size. For example, fixed size bucket 202-1 in each of the instances 206 may store pointers to memory blocks of 1 MB; fixed size bucket 202-2 in each of the instances 206 may store pointers to memory blocks of 3 MB; and, fixed size bucket 202-3 in each instance 206 may store pointers to memory blocks of 5 MB. In an alternative embodiment, the fixed size buckets 202 across each of the instances 206 store pointers to memory blocks of different sizes.

In an embodiment, the pointers in each of the fixed size buckets 202, 204 across each of the instances point to different memory blocks. For example, each of the buckets 202, 204 stores data structures 210 containing the pointers to the memory blocks of a particular size. The data structures 210 will be explained further below.

In an embodiment, engine 208 is a transaction manager for each of the buckets 202, 204. The engine 208 manages communication between the client 102, the fixed size buckets 202, the global bucket 204, and the memory 112 for its respective instance 206. For example, engine 208-1 may access and retrieve the pointers to a memory block of a particular size from fixed size bucket 202-1 based on a request from client 102. Then, the engine 208-1 may access and retrieve the block of memory in memory 112 pointed to by the retrieved pointer.

In an embodiment, the engine 208 may access and insert fragments into the data structures 210 of the buckets 202, 204. The engine 208 may lock access to the accessed bucket 202, 204 so no other engines 208 have access to that bucket. For example, engine 208-1 may access global bucket 204-1 in instance 206-1 to retrieve a memory address not associated with a fixed size bucket 202. The engine 208-1 may use a spinlock on global bucket 204-1 so the other engines 208-2 through 208-N cannot access the contents of global bucket 204-1 in instance 206-1 while engine 208-1 accesses global bucket 204-1. However, the spinlock may only apply to a particular bucket of a particular instance, such as global bucket 204-1 in instance 206-1. Engine 208-2 may therefore access any other bucket in instance 206-1 other than the global bucket 204-1 during the time engine 208-1 accesses the global bucket 204-1.

In an embodiment, as noted above, each engine 208 is associated with an instance 206. For example, engine 208-1 is associated with instance 206-1. Engine 208-1 initially accesses and retrieves buckets from fixed size buckets 202 or global buckets 204 in instance 206-1. If engine 208-1 does not find a requested memory size in instance 206-1, engine 208-1 may access the fixed size buckets 202 or global buckets 204 in the other instances 206-2 through 206-N. For example, engine 208-1 may retrieve a pointer to a 1 MB memory allocation from fixed size bucket 202-1 from associated instance 206-1. However, in the case that the fixed size bucket 202-1 is empty and does not have any pointers to a 1 MB memory allocations, engine 208-1 will search for a pointer to a 1 MB memory allocation in the next available instance 206. Engine 208-1 will then check the fixed size bucket 202-1 in instance 206-2. The engine 208-1 will continue to check each other instance 206 until a pointer to a 1 MB memory allocation is retrieved. As mentioned above, upon retrieval the engine 208-1 carves the memory block from memory 112 based on the pointer and passes the memory block to client 102.

In an embodiment, a processor associated with each of the nodes 108 may randomly assign an engine 208 to one of the instances 206 associated with that node 108 based on a thread id number or a random seed id number. For example, processor of node 108-0 assigns id number 4 to engine 208-1 of node 108-0. Id number 4 associates engine 208-1 to instance 206-4 of node 108-0. By associating an id number to each engine 208 in a respective node 108, each engine 208 is guaranteed to be associated with a different instance 206 upon boot up.

In an embodiment, engine 208 may access memory 112 after recognizing one or more of the buckets are empty across all the instances 206. For example, engine 208-1 recognizes fixed size bucket 202-1 and global bucket 204 in each instance 206 is empty when accessing and trying to retrieve a pointer to a 1 MB memory allocation. In response, engine 208-1 in node 108-0 will initially search in memory 112-0 in node 108-0 and scan for a memory chunk size of 1 MB. If local memory 112-0 provides no size of a contiguous 1 MB memory address space, then engine 208-1 will search in memory 112-1. The engine 208-1 scans each subsequent memory 112 for a 1 MB memory allocation until one is found. Upon finding a 1 MB allocation in a memory 112, engine 208-1 allocates the 1 MB block of memory from the memory 112 and stores a pointer to the address in fixed size bucket 202-1.

In an embodiment, engine 208 returns the memory block from client 102 to the memory 112. For example, engine 208 deallocates the memory block back to memory 112. In addition, the engine 208 returns the pointer to the memory block to the bucket where the pointer was originally retrieved. For example, engine 208-1 accesses fixed size bucket 202-1 for retrieving a pointer to a 1 MB memory allocation for client 102. Engine 208-1 passes the 1 MB memory allocation to client 102 based on the pointer. After client 102 finishes using the 1 MB memory, client 102 releases and deallocates the 1 MB memory address back to node 108. The engine 208-1 also returns the pointer to the deallocates 1 MB memory allocation to fixed size bucket 202-1.

In an embodiment, engines 208 may simultaneously be able to handle multiple tasks. These task may be searching for and allocating memory from memory 112; processing requests from client 102; and, interacting with the different buckets. In an alternative embodiment, an engine 208 which is not active may be used to scan the buckets in each of the instances 206 and fill the buckets with pointers to memory addresses to a max fill threshold. For example, engine 208-3 is not active. Specifically, engine 208-3 has not received a request from client 102. Accordingly, engine 208-3 may scan each bucket 202, 204 in each of the instances 206 to examine the max fill level of each bucket 202, 204. If engine 208-3 recognizes fixed size bucket 202-1 has 5 pointers and the max fill threshold is 10 pointers, engine 208-3 may scan the associated memory 112, such as memory 112-0, and allocate 5 more pointers to memory blocks for fixed size bucket 202-1 to meet the max fill threshold.

In an embodiment, the max fill threshold may be predefined by a configuration file. The configuration file may be read by every engine 208 upon boot up of the DBMS 104. For example, the configuration file may specify a max fill threshold of 10 memory addresses for each bucket. The max fill threshold may be chosen based on the size of the memory allocated for the bucket memory manager 110. The memory allocated for the bucket memory manager 110 will be explained below.

Figure 3:
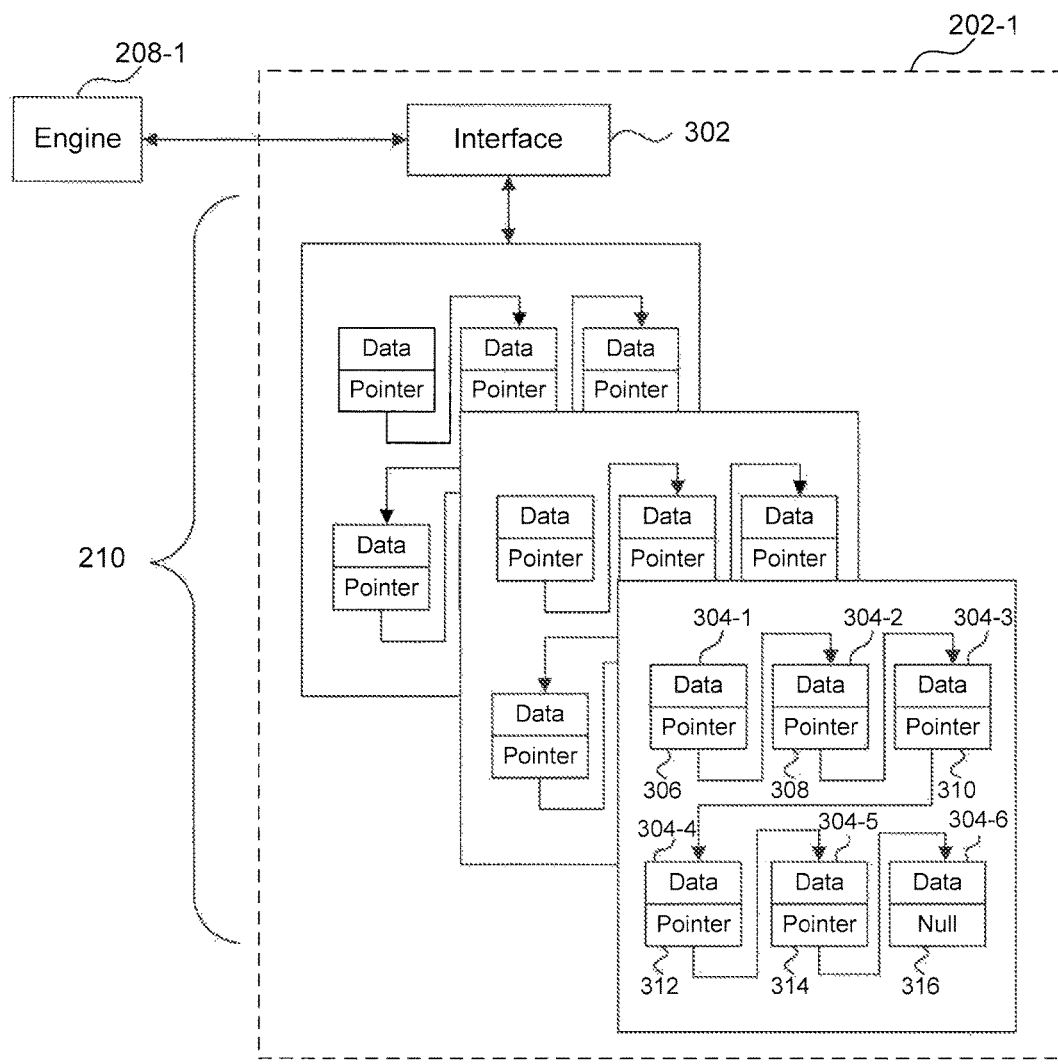
FIG. 3 is a block diagram of an engine interacting with a bucket in a bucket memory manager, according to some embodiments.

FIG. 3 is a block diagram of an engine 208-1 interacting with a fixed size bucket 202-1 in the bucket memory manager 110, according to an embodiment. The engine 208-1 communicates with interface 302 of fixed size bucket 202-1. The interface 302 allows the engine 208-1 to communicate with the data structures 210. Specifically, engine 208-1 communicates with the interface 302 to retrieve particular memory addresses from the data structures 210. Further, the engine 208-1 communicates with the interface 302 to insert new memory addresses into the data structure 210. In addition, the engine 208-1 may communicate to the interface 302 to remove all the data structures 210.

In an embodiment, each of the buckets 202, 204 adheres to the architecture described in FIG. 3. For example, each of the buckets 202, 204 includes data structures 210 containing one or more data elements 304. Each data element 304 contains a memory address, a size associated with the memory address, and a pointer, such as pointers 306 through 316, pointing to the address of the next data element 304.

In an embodiment, the data structures 210 organize the data elements 304 in a manner that facilitates easy retrieval and insertion. For example, the data elements 304 shown in FIG. 3 are organized in a linked list manner. The linked list manner includes a data element 304 and a pointer 306 pointing to the next data element 304. The last data element 304-6 includes a pointer 316 pointing to NULL. The NULL denotes the end of the linked list. The data structures 210 may not be limited to linked lists but may also be organized as dynamic arrays, stacks, queues, hash tables, heaps, and binary trees, according to some embodiments.

Figure 4:
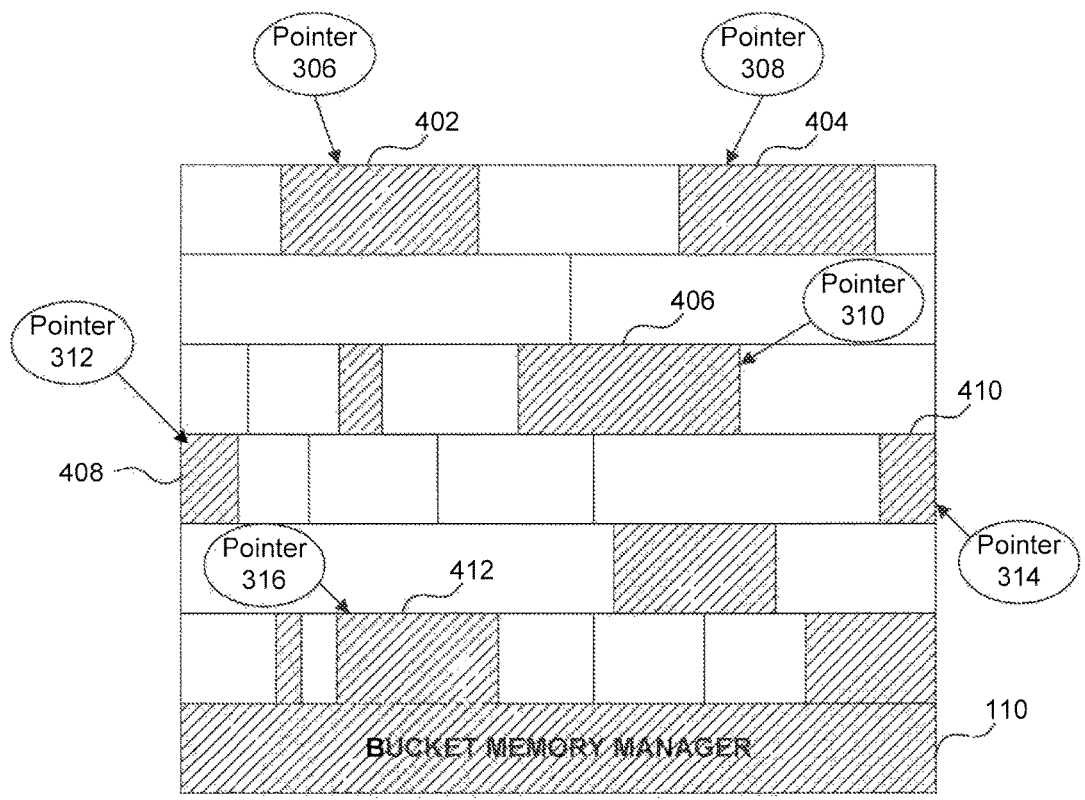
FIG. 4 is a block diagram of a fragmented memory block, according to some embodiments.

FIG. 4 is a block diagram of a memory block 112, according to an embodiment. The memory block 112 shows the various memory locations 402 through 412 pointed to by pointers 306 through 316 respectively. As shown in FIG. 3, the pointers 306 through 316 are contained by the fixed size bucket 202-N from the data elements 304 in FIG. 3. Also mentioned above, the data elements 304 contain only the addresses, the pointers to the addresses, and size of the memory location, not the memory itself from memory block 112. In addition, bucket memory manager 110 is contained in memory 112. A chunk of memory from memory 112 is set aside to store the contents of the bucket memory manager 110. This chunk of memory for the bucket memory manager 110 is calculated upon the max fill threshold of each data structure, the number of instances 206 allocated, and the number of buckets within those instances 206 upon boot up, according to an embodiment. The max fill threshold, the number of instances 206, and the number of buckets within those instances 206 may be preconfigured in the configuration file to be read upon boot up of the DBMS 104.

Figure 5:
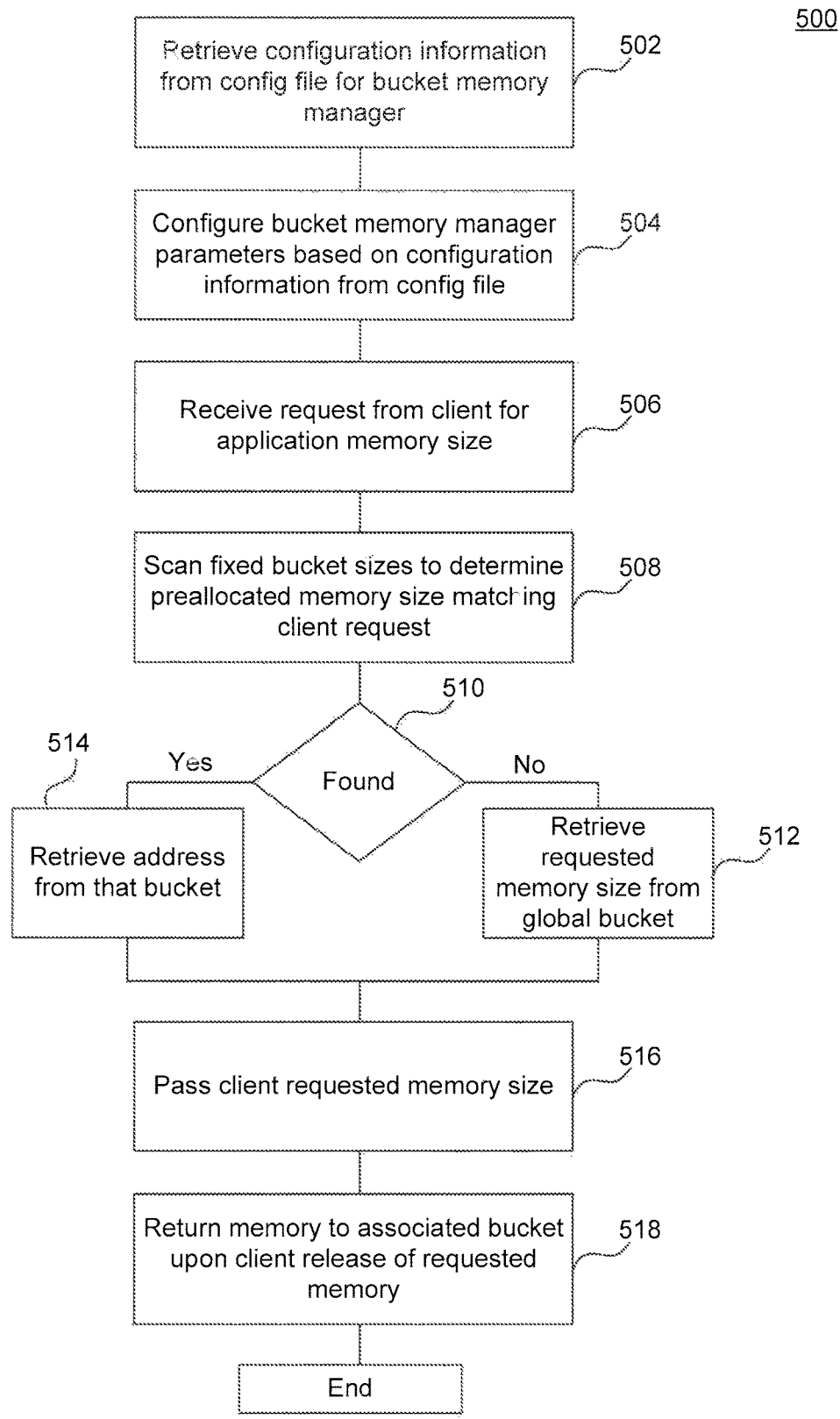
FIG. 5 is a flowchart illustrating operations of the bucket memory manager, according to some embodiments.

FIG. 5 is a flowchart for a method 500 for operations of the bucket memory manager 110, according to an embodiment. Method 500 can be performed by processing logic that can comprise hardware (e.g., circuitry, dedicated logic, programmable logic, microcode, etc.), software (e.g., instructions executing on a processing device), or a combination thereof.

In 502, an engine 208 retrieves configuration information from a configuration file for the bucket memory manager parameters. For example, upon boot up of the DBMS 104, engines 208 in each of the nodes 108 read information from a configuration file. Specifically, the information may consist of the number of instances 206 for each bucket memory manager 110, the number of buckets 202, 204 for each instance 206, the bucket sizes for the fixed size buckets 202, and a max fill threshold for each of the buckets 202, 204. In addition, the configuration information may contain a bucket memory manager run mode. Specifically, the bucket memory manager run mode may operate in two different settings. The two settings are manual mode and self-tuning mode. The method 500 illustrates the manual mode where the bucket sizes for the fixed size buckets 202 are preconfigured based on the information read from the configuration file. The self-tuning mode will be further explained below. In an embodiment, the configuration file may be stored in disk 116 and configured by a client 102.

In 504, the bucket memory manager parameters are configured based on the configuration information retrieved from the configuration file. For example, as mentioned above, nodes 108 are initialized based on the configuration information to have 5 instances 206; each instance 206 contains 4 fixed size buckets 202; and, the bucket sizes of each bucket 202, 204 are 1 MB, 3 MB, 5 MB, and 10 MB. In addition, the max fill threshold for each of the buckets 202, 204 has a fill level of 20. However, these numbers are for illustrative purposes only, other numbers may be used.

In 506, the database 106 receives a request from client 102 for a requested memory size. For example, client 102 launches a particular application, such as a word document, which requires a particular memory size to execute and run. The database 106 receives a request from client 102 for a particular memory size, such as 3 MB, in order to run the word document. In an embodiment, a node 108 is chosen to receive the request of client 102, such as node 112-0, based on a workload of the nodes. An engine 208, such as engine 208-1 in node 112-0, receives the request from client 102.

In 508, an engine 208, such as engine 208-1, scans the fixed size buckets 202-1 through 202-N of an associated instance 206 for a particular memory size based on a requested memory size from a client 102. For example, engine 208-1 receives a 3 MB request from client 102. In response, engine 208-1 scans for a match of a bucket size in the fixed size buckets 202 and the global bucket 204. In an embodiment, the engine 208 scans the fixed size buckets 202 first before scanning the global bucket 204.

In 510, engine 208 determines if a match was found in one of the fixed size buckets 202. For example, engine 208-1 scans for 3 MB sizes in the fixed size buckets 202. Engine 208-1 finds fixed size bucket 202-3 holds pointers to 3 MB memory blocks. In 514, that memory pointer is retrieved from the data structure 210 in the associated fixed size bucket 202, such as fixed size bucket 202-3. In response, the engine 208 grabs the allocated memory block based on the memory pointer.

If a match was not found, then in 512, the engine 208 scans the global bucket 204 for the requested memory size. In an embodiment, the global bucket 204 stores the pointers of various memory addresses and associated sizes in ascending order. In an embodiment, the global bucket 204 stores the various addresses and associated sizes in ascending order of the addresses. The ascending order architecture facilitates the engine 208 to efficiently find a memory address of the requested size.

In 516, the engine 208 passes the requested memory block based on the retrieved pointer to the client 102. For example, the engine 208 passes the memory block 402 from memory 112 based on the pointer 306 retrieved from the fixed size bucket 202-1 to the client 102. In an embodiment, the engine 208 maintains a tracking system to determine which memory addresses or memory blocks 402 through 412 are currently in use by a client 102. This ensures another engine 208 does not allocate a memory block overlapping with memory currently in use by the client 102. Specifically, the tracking system may be a table stored in the disk 116 storing a copy of the pointers 306 through 316 of the requested memory blocks. In an alternative embodiment, each bucket memory manager 110 keeps track of the memory block addresses in the respective engines 208.

In 518, the engine 208 receives the returned memory block from client 102 upon completion or application closing. For example, client 102 frees the 3 MB memory address and the engine 208 returns the pointer 306 of the 3 MB memory address to the associated fixed size bucket 202-1. Specifically, the engine 208 inserts the returned pointer 306 back into the data structure 210 in the same fixed size bucket 202-1 from where it was retrieved. In an embodiment, the engine 208 clears an entry in the tracking system associated with the returned pointer.

Figure 6:
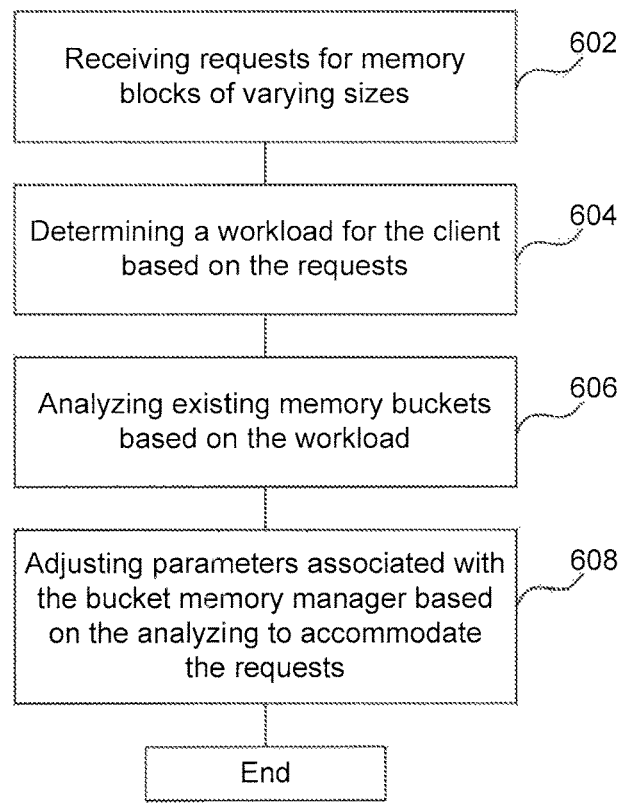
FIG. 6 is a flowchart illustrating a self-tuning mechanism in a bucket memory manager, according to some embodiments.

FIG. 6 is a flowchart illustrating a self-tuning mechanism in a bucket memory manager, according to some embodiments. Method 600 can be performed by processing logic that can comprise hardware (e.g., circuitry, dedicated logic, programmable logic, microcode, etc.), software (e.g., instructions executing on a processing device), or a combination thereof.

In 602, requests are received for memory blocks of various sizes from client 102.

In an embodiment, the DBMS 104 may receive requests for memory blocks from client 102 of various sizes such as 3 MB, 4 MB, and 5 MB. These various sizes are based on the applications of client 102.

In 604, a workload for client 102 is determined based on the memory requests. In an embodiment, the workload of client 102 is based on a plurality of factors of the memory requests. For example, the workload may be the types of memory requests, the sizes of memory requests, and the frequencies of memory requests from a client 102. More detail will be explained below.

In 606, the existing buckets 202, 204 are analyzed based on a workload of client 102. In an embodiment, the bucket memory manager 110 continuously monitors parameters associated with the buckets 202, 204. The parameters associated with the buckets 202, 204 may be the number of data elements 304 or fragments in the buckets 202, 204; the allocations associated with an engine; total number of memory requests for each instance 206; the total number of buckets 202, 204 and the total number of instances 206; locking conditions associated with the buckets 202, 204; the sizes of the fixed size buckets 202, and, any configuration setting stored in the configuration file. More detail on each of these parameters will be explained below.

In 608, parameters associated with the bucket memory manager 110 are adjusted based on the analyzing to accommodate the requests. In an embodiment, the bucket memory manager 110 adjusts the bucket memory manager parameters based on the set of rules extracted from the configuration information. More detail on the adjustment of these parameters will be explained below.

Figure 7:
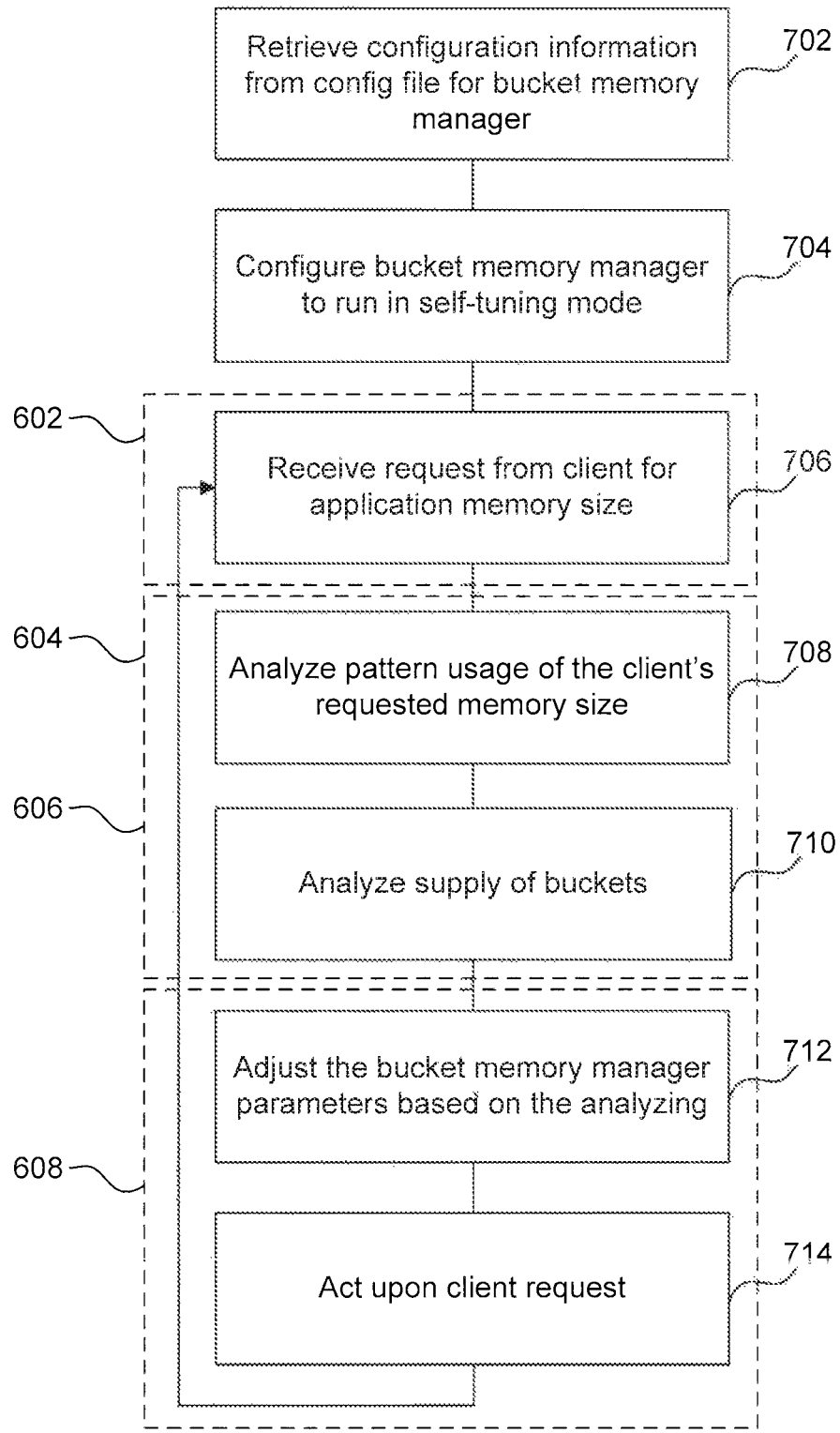
FIG. 7 is a flowchart illustrating operations of a self-tuning mechanism in a bucket memory manager, according to some embodiments.

FIG. 7 is a flowchart for a method 700 for operations of the self-tuning mechanism in the bucket memory manager 110, according to an embodiment. Method 700 can be performed by processing logic that can comprise hardware (e.g., circuitry, dedicated logic, programmable logic, microcode, etc.), software (e.g., instructions executing on a processing device), or a combination thereof.

In 702, the engine 208 retrieves configuration information from a configuration file for the bucket memory manager parameters. For example, upon boot up of the DBMS 104, engines 208 in each of the nodes 108 read information from a configuration file. Specifically, the information may consist of the number of instances 206 for each bucket memory manager 110, the number of buckets for each instance 206, the bucket sizes for the fixed size buckets 202, and a max fill threshold for each of the buckets. As mentioned above, the configuration file also includes a bucket memory manager run mode. As method 500 above illustrates the manual mode of the bucket run manager flag, methods 600 above and 700 below illustrates the self-tuning mode where the bucket memory manager run mode is set to self-tuning mode. Further, the configuration information includes a set of rules for the bucket memory manager 110 to follow while the bucket run manager flag is set to the self-tuning mode. These set of rules instruct the bucket memory manager 110 for running in self-tuning mode, as explained below.

In 704, the bucket memory manager parameters are configured based on the self-tuning mode and the configuration information retrieved from the configuration file. For example, when in the self-tuning mode, the configuration information initially sets the number of instances 206 for each bucket memory manager 110, the number of buckets for each instance 206, and a max fill threshold for each of the buckets. The other configuration information, as mentioned in the above paragraph, adapts to the needs of client 102, according to an embodiment. In an alternative embodiment, in the self-tuning mode, the bucket memory manager parameters adapt to a particular need of client 102.

In 706, the database 106 receives a request from client 102 for a requested memory size. The same function occurs here as mentioned above in 506 and 602. In addition, a memory request counter is initialized for each new memory request made from client 102. For example, a memory request counter for 1 MB is initialized to 1 when a request for 1 MB is received. The associated memory request counter is incremented by one for each subsequent memory request of the same size. In an embodiment, all of the engines 208 maintain and monitor each of the memory request counters. In an alternative embodiment, each request from a client 102 is stored in an array to track all requests, as explained below.

In 708, the bucket memory manager 110 analyzes a workload of a client 102. For example, the workload may be the types of memory requests, the sizes of memory requests, and the frequencies of memory requests from a client 102. In addition, the bucket memory manager 110 analyzes the amount of time a memory block is utilized by the client 102. In an embodiment, the amount of time a memory block is utilized by client 102 initializes when the engine 208 passes the memory block to the client 102 and ends when the engine 208 receives the memory block from the client 102. The engine 208, which passes and receives the memory block to and from client 102, tracks the time utilized via a timer.

In 710, the bucket memory manager 110 analyzes the supply of buckets. Specifically, the bucket memory manager 110 continuously monitors parameters associated with the buckets. In an embodiment, the bucket memory manager 110 monitors the number of times an engine 208 steals a memory address from another instance 206. For example, the engine 208-1 accesses fixed size bucket 202-1 in an associated instance 206-1 for a 1 MB memory address. However, fixed size bucket 202-1 is empty and does not have any 1 MB memory addresses. In response, engine 208-1 may access fixed size bucket 202-1 in another instance 206-2 and steal a 1 MB memory allocation to give to client 102. The number of times an engine 208 steals a memory address from another instance 206 is stored in a variable labeled instance_empty. The contents of the instance_empty are incremented by one each time this situation occurs.

In an embodiment, the bucket memory manager 110 monitors the number of data elements 304 or fragments in each data structure 210. For example, data structures 210 may each contain a different number of data elements 304 ranging from 0 to max fill threshold. Each engine 208 continuously monitors the data elements 304 in each of the buckets 202, 204 with the associated instance 206. The number of data elements 304 in a snapshot is stored in variable numfrags. The snapshot may be taken periodically, such as every hour, and before the system shuts down.

In an embodiment, the bucket memory manager 110 monitors parameters associated with the number of fragments in each fixed size bucket 202 and global bucket 204. For example, each engine 208 monitors the range of the number of fragments in each of the buckets. Specifically, the engine 208 monitors the highest and the lowest number of fragments obtained in each data structure 210. The highest number of fragments is stored in a variable labeled highwatermark and the lowest number of fragments is stored in a variable labeled lowwatermark. The contents of these two variables are stored from a snapshot at an instance in time of the bucket memory manager 110. The snapshot may be taken periodically, such as every hour, and before the system shuts down.

In an embodiment, the bucket memory manager 110 monitors the number of times a misallocation occurs. For example, engine 208-1 may receive a request from client 102 for a memory size of 1 MB. Before engine 208-1 accesses and has a chance to retrieve the memory request of 1 MB from fixed size bucket 202-1 in instance 206-1, engine 208-2 accesses and retrieves the memory address in instance 206-1 that engine 208-1 planned to retrieve. The engine 208-1 recognizes this situation as a misallocation, according to an embodiment. In response, engine 208-1 initializes an allocs_missed variable to keep track of the number of times this situation occurs for a particular bucket and an associated instance 206. Each subsequent time this occurs, engine 208-1 increments the contents of the allocs_missed variable by one.

In an embodiment, the bucket memory manager 110 monitors the number of times engine 208 allocates from global bucket 204-1 despite an available fixed size bucket 202. For example, engine 208-1 receives a request from client 102 for a memory size of 3 MB. Engine 208-1 accesses fixed size bucket 202-3 of instance 206-1, which stores pointers to 3 MB memory blocks. However, the fixed size bucket 202-3 is empty. Engine 208-1 proceeds to check each fixed size bucket 202-3 of instances 206-2 to 206-N yet finds no pointers to 3 MB memory blocks. As a result, engine 208-1 goes to the global bucket 204-1 of instance 206-1 for a pointer to a 3 MB memory block. If engine 208-1 recognizes the global bucket 204-1 does not have a pointer to a 3 MB memory allocation, the engine 208-1 allocates a 3 MB memory allocation from memory 112. At the same time, the other engines 208 are signaled by engine 208-1 to allocate 3 MB memories from memory block 112 to fill their buckets storing pointers to the 3 MB memory allocations. In response, engine 208-1 initializes a bucket_empty variable to keep track of the number of times this situation occurs for a particular bucket and associated instance 206. Each subsequent time this situation occurs, engine 208-1 increments the contents of the bucket_empty variable by one.

In an embodiment, the bucket memory manager 110 monitors the total number of requests for memory addresses for each instance 206. For example, engine 208-1 receives 100 requests from client 102 for memory addresses whereas engine 208-2 receives 50 memory requests. Each engine 208 keeps track of the number of requests received starting after boot up in an allocs variable. The engine 208 increments the contents of the allocs variable by one every time a request is received.

In an embodiment, the bucket memory manager 110 monitors the current number of buckets 202, 204 and the current number of instances 206. The number of buckets 202, 204 is stored in a variable labeled numbuckets and the number of instances 206 is stored in a variable labeled numinstances. At a specific instance in time, engine 208 may acquire a snapshot of the number of buckets 202, 204 and the number of instances 206 in bucket memory manager 110. The snapshot may occur periodically, such as every hour and before the system shuts down.

In an embodiment, the bucket memory manager 110 monitors the number of times the bucket memory manager 110 tried allocating a memory address under a locked condition. For example, engine 208-1 accesses fixed size bucket 202-1. However, fixed size bucket 202-1 is locked due to engine 208-2 accessing and retrieving a pointer to a memory address. The number of retries for accessing a locked bucket 202 is stored in a variable labeled retries. Each time the locked bucket is accessed, the contents of the retries variable is incremented by one. Each engine 208 creates a separate retries variable for each bucket 202 in the associated instance 206.

In an embodiment, the bucket memory manager 110 monitors the number of times the bucket memory manager 110 failed to allocate a memory address request. Specifically, the bucket memory manager 110 counts the number of times an engine 208 returned NULL to a memory request. For example, engine 208-1 scans all of the fixed size buckets 202 and all of the global size buckets 204 for a pointer to a 6 MB memory allocation request. However, none of the buckets in the bucket memory manager 110 contain a pointer to a 6 MB memory allocation nor is there enough contiguous memory space in memory 112 to allocate a 6 MB memory space. As a result, engine 208-1 returns a NULL to client 102. A variable labeled failures for each engine 208 stores the number of times a NULL is returned to the client. Each time a NULL is returned by one of the engines 208, the contents of the variable labeled failures is incremented by one.

In an embodiment, the bucket memory manager 110 monitors every request for a memory address from client 102. For example, engine 208-1 receives five 4 MB address requests, six 1 MB address requests, and three 6 KB address requests. Engine 208-2 receives four 8 KB address requests and three 4 MB address requests. An array labeled statarray [n] in each engine 208 keeps track of the received address request for each of the engines 208 in a respective bucket memory manager 110. The statarray[n] stores each memory address request associated with a timestamp when an engine 208 receives the request.

In 712, the bucket memory manager 110 adjusts the bucket memory manager parameters based on the analyzing from 604 and 606. 712 expands upon the functionality of 608 from above. Further, the bucket memory manager 110 adjusts the bucket memory manager parameters based on the set of rules extracted from the configuration information. As mentioned above, these set of rules define the self-tuning mode for the bucket memory manager 110.

In an embodiment, one rule defines the fixed size buckets 202 with the most popular address sizes. Specifically, each of the fixed size buckets 202 needs to be tuned to the workload of the client 102. For example, the statarray[n] is sampled by engine 208 for a certain amount of time, such as 5 minutes, to monitor the memory address requests. If engine 208 notices a particular memory address request, such as 5 MB, is more frequently requested from client 102 where these requests consume more than twenty percent of the statarray[n] for a length of time, the engine 208 will automatically add a 5 MB bucket 202 to instance 206. In general, for self-tuning, the bucket memory manager 110 monitors the statarray[n] for a predetermined period. If a requested memory address consumes greater than a percentage threshold of the total allocations in statarray[n] during the predetermined period and a fixed size bucket 202 for the requested memory allocation does not already exist, a fixed size bucket 202 is created for the size of the requested memory allocation. In an embodiment, when a fixed size bucket 202-N is added to one instance 206-1 to match the current workload of client 102, the other instances 206-2 through 206-N also add a fixed size bucket 202-N of the requested memory address size.

In an embodiment, another rule is to avoid having too many memory address sizes in an unused bucket 202. Specifically, engine 208 may contain fixed size buckets 202 of sizes 1 MB, 3 MB, 4 MB, and 5 KB. However, if the engine 208 notices the 5 KB fixed size bucket 202 is rarely used, then the engine 208 removes the 5 KB fixed size bucket 202 in order to preserve memory. For example, the statarray[n] is sampled by engine 208 for a predetermined period, such as 5 minutes, to monitor the memory address requests. If engine 208 notices a memory address request, such as 5 KB, consumes less than one percent of the total allocations in statarray[n] during that predetermined period, then the engine 208 will remove the 5 KB fixed size bucket 202. Removal of the memory addresses for the 5 KB fixed size bucket 202 consists of freeing the memory fragments, according to an embodiment. Therefore, if a requested memory address amount consumes less than a percentage threshold of the total allocations in the statarray[n] after sampling for a predetermined period, the engine 208 removes that fixed size bucket 202 from the instances 206.

In an embodiment, another rule is to avoid and reduce any engine/bucket contention. Specifically, a goal of the self-tuning is to pass memory efficiently and avoid any contention between buckets. For example, engine 208-1 of instance 206-1 tries to steal memory addresses from fixed size bucket 202-1 of instance 206-2. However, engine 208-1 of instance 206-2 is in the process of accessing and retrieving a memory address from the fixed size bucket 202-1 of instance 206-2. Therefore, engine contention occurs and the bucket memory manager 110 degrades performance. In order to alleviate this issue, engine 208 adds more instances 206. In this particular rule, the allocs_missed variable is sampled for a predetermined period, such as 5 minutes, to monitor the total memory allocation requests and the number of times another engine 208-2 stole from an engine 208-1. If the engine 208-1 notices the contents of allocs_missed is greater than the predetermined period, such as ten percent of the total amount of memory allocation addresses over 5 minutes, then another instance 206-N is added to the bucket memory manager 110. The added instance 206-N is populated with the same fixed size buckets 202 as the other instances 206 and a global bucket 204. Upon adding an instance 206, an engine 208-N associated with the newly added instance 206-N, allocates new memory addresses from memory 112 and fills the fixed size buckets 202 and the global bucket 204 with the new memory addresses.

In an embodiment, another rule is to avoid having too many memory addresses sizes in an unused instance 206. Specifically, another goal of the self-tuning mode is to pass memory efficiently and avoid any memory that is not being used in an instance 206. Further, another goal of this rule is to ensure maximum use of each instance 206. If an instance 206 is not being used at all and not stealing memory address from other instances 206, then that instance 206 should be removed. Specifically, the allocs_missed variable is sampled for a predetermined period, such as 5 minutes, to monitor the total memory allocation requests and the number of times another engine 208-2 steals from an engine 208-1. If the engine 208-1 notices the allocs_missed contents is less than a predetermined threshold, such as 0.1 percent of the total amount of memory allocations, then that particular instance 206, is removed from the bucket memory manager 110.

Because of each of these rules, there are variations to actions that may be performed. Specifically, a fixed size bucket 202 may be created or removed and an instance 206 may be created or removed. Further, additional addresses may be added or removed from the fixed size bucket 202 or global bucket 204 if the bucket is greater than the max fill threshold or does not have any addresses in the bucket. In an embodiment, each engine 208 may perform these actions in parallel with actions from the other engines 208.

In 714, the engine 208 acts on the request from client 102 and passes the requested memory address to the client 102. 714 expands upon the functionality of 608 from above. As mentioned in 516, the engine 208 passes a pointer of the requested memory address from the fixed size bucket 202-1 or the global bucket 204 to the client 102.

This process loops at 706 to monitor the bucket memory manager 110 upon receiving a request from client 102 for a requested memory address, according to an embodiment. In an alternative embodiment, the bucket memory manager 110 continuously monitors the self-tuning bucket memory manager parameters even when no requests are received for memory allocation from client 102.

Figure 8:
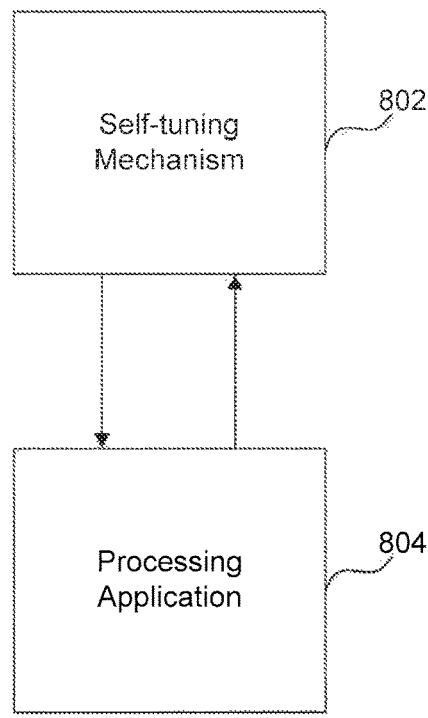
FIG. 8 is a block diagram of a self-tuning environment, according to some embodiments.

FIG. 8 is a block diagram of a self-tuning environment 800, according to an embodiment. In addition or alternatively to the description of the operations of the self-tuning mechanism within the bucket memory manager 110 with respect to FIGS. 6 and 7, FIG. 8 illustrates a self-tuning mechanism 802 operating with one or more processing application(s) 804. In some embodiments, self-tuning mechanism 802 begins operating with processing application 804 upon boot up of the DBMS 104, or at some time thereafter. Specifically, the self-tuning mechanism 802 may be compiled or linked with the processing application 804 upon a client 102 invoking the processing application 804. The processing application 804 may be any application associated with a processor or one or more engines or computing modules. For example, the processing application 804 may be the bucket memory manager 110, a web browser, a media player, a computer game, to name a few examples, or any combination thereof. The self-tuning mechanism 802 may be included with and/or operate with the processing application 804 to improve efficiency and processing times associated with the processing application 804.

In an embodiment, the self-tuning mechanism 802 in the environment 800 follows a similar rule structure as the self-tuning mechanism described in method 700 with regard to the bucket memory manager 110. In an embodiment, however, the rule structure of the self-tuning mechanism 802 is defined following the compilation of the processing application 804 with the self-tuning mechanism 802. In an embodiment, following compilation, the rule structure is set based on configuration information in a configuration file associated with the processing application 804. For example, if the processing application 804 is a central processing unit (CPU) that is processing items off a queue, the parameters defined in the configuration file may set the number and depth of the queues; the amount of time items are allowed to remain on the queue before removal; and/or, a max threshold amount of items in any queue. In an embodiment, the self-tuning mechanism 802 utilizes the same or similar rule structure described in method 700 for the processing application 804 based on this configuration information. For example, similar to as described in 712, the bucket memory manager parameters are adjusted based on the analyzing in 604 and 606. Similarly, the self-tuning mechanism 802 may adjust the parameters for the CPU processing items off a queue example based on similarly defined rules. The same or similar functionality can be applied for any self-tuning mechanism 802 with any associated processing application (s) 804.

Figure 9:
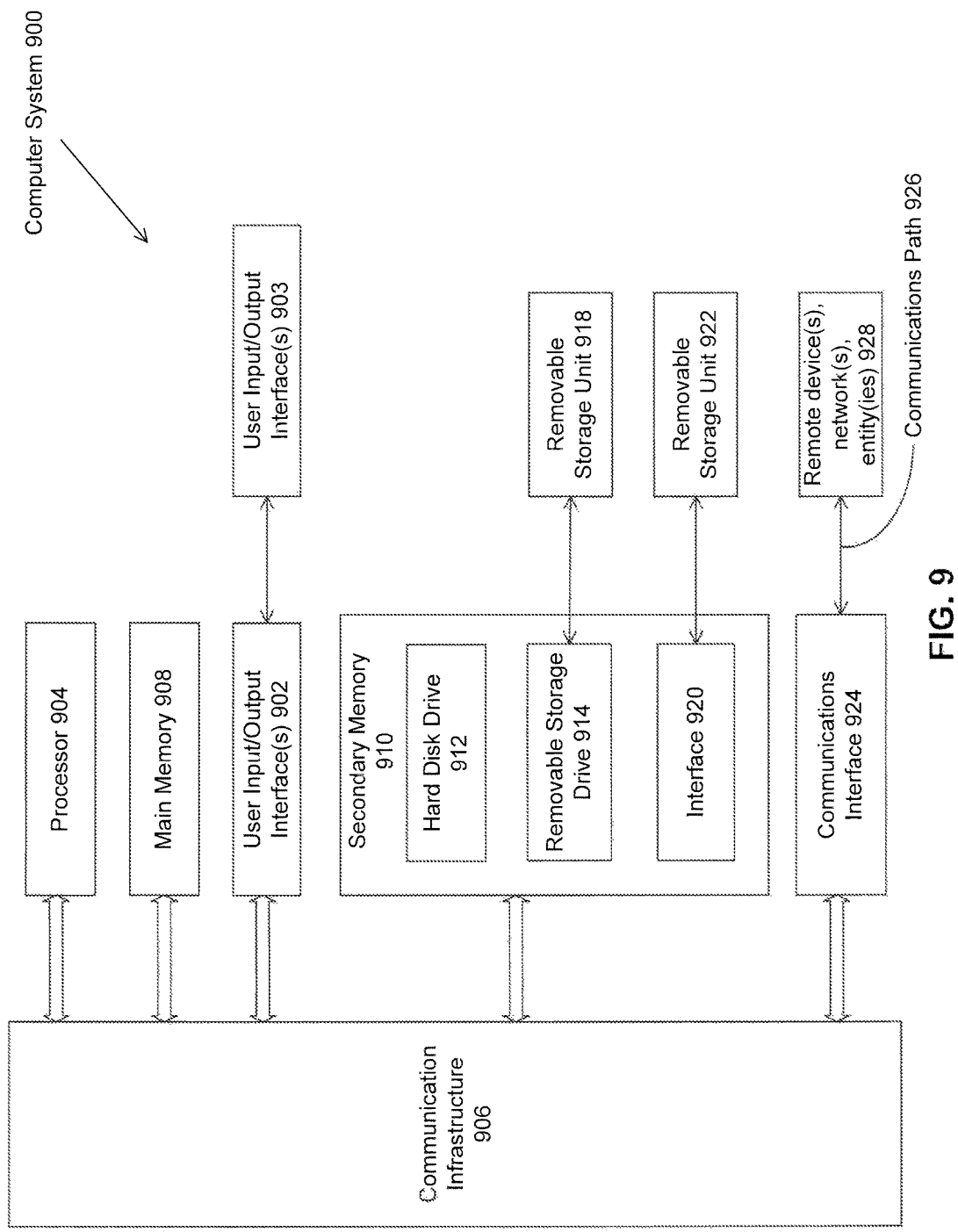
FIG. 9 is an example computer system useful for implementing various embodiments or portions thereof.

Various embodiments can be implemented, for example, using one or more computer systems, such as computer system 900 shown in FIG. 9. Computer system 900 can be used, for example, to implement method 500 of FIG. 5, method 600 of FIG. 6, and method 700 of FIG. 7. For example, computer system 900 can retrieve a memory allocation based on a request from client 102 using buckets in a bucket memory manager 110. Computer system 900 can further self-tune a plurality of bucket memory manager parameters based on a current workload of memory allocation requests from client 102, according to some embodiments. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/or any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method, comprising:
    receiving a request from a client for a memory block of a first size;
    in response to the receiving, incrementing a counter corresponding to the first size, wherein the counter indicates a number of requests for a memory block of the first size;
    monitoring the counter for a predetermined amount of time;
    in response to the monitoring, determining that the counter exceeds a threshold corresponding to the predetermined amount of time; and
    in response to the determining, allocating a new memory bucket of the first size.

2. The method of claim 1, wherein the threshold is a percentage of total allocations during the predetermined amount of time.

3. The method of claim 1, further comprising:
    receiving a plurality of memory block requests from the client, wherein the plurality of memory block requests include requests for memory blocks of at least two different sizes;
    incrementing a plurality of counters corresponding to the at least two different sizes; and
    storing the plurality of counters in an array with data associating the array with the client.

4. The method of claim 3, wherein the counter corresponding to the first size is stored in the array and the monitoring further comprises:
    sampling the array for the predetermined amount of time to determine a value of the counter.

5. The method of claim 3, wherein the threshold is a value determined relative to the plurality of counters in the array.

6. The method of claim 1, further comprising:
    monitoring a second counter for the predetermined amount of time, wherein the second counter corresponds to a number of times a first engine corresponding to a first instance has utilized memory from a second instance;
    in response to the monitoring, determining that the second counter exceeds a second threshold corresponding to the predetermined amount of time; and
    in response to the determining, generating a third instance having a number of buckets equal to the first instance.

7. The method of claim 1, wherein the allocating further comprises:
    transmitting to the client a pointer to a memory address corresponding to the new memory bucket.

8. A system, comprising:
    a memory; and
    at least one processor coupled to the memory and configured to:
        receive a request from a client for a memory block of a first size;
        in response to the receiving, increment a counter corresponding to the first size, wherein the counter indicates a number of requests for a memory block of the first size;
        monitor the counter for a predetermined amount of time;
        in response to the monitoring, determine that the counter exceeds a threshold corresponding to the predetermined amount of time; and
        in response to the determining, allocate a new memory bucket of the first size.

9. The system of claim 8, wherein the threshold is a percentage of total allocations during the predetermined amount of time.

10. The system of claim 8, wherein the at least one processor is further configured to:
    receive a plurality of memory block requests from the client, wherein the plurality of memory block requests include requests for memory blocks of at least two different sizes;
    increment a plurality of counters corresponding to the at least two different sizes; and
    store the plurality of counters in an array with data associating the array with the client.

11. The system of claim 10, wherein the counter corresponding to the first size is stored in the array and to monitor the counter, the at least one processor is further configured to:
    sample the array for the predetermined amount of time to determine a value of the counter.

12. The system of claim 10, wherein the threshold is a value determined relative to the plurality of counters in the array.

13. The system of claim 8, wherein the at least one processor is further configured to:

monitor a second counter for the predetermined amount of time, wherein the second counter corresponds to a number of times a first engine corresponding to a first instance has utilized memory from a second instance;

in response to the monitoring, determine that the second counter exceeds a second threshold corresponding to the predetermined amount of time; and in response to the determining, generate a third instance having a number of buckets equal to the first instance.

14. The system of claim 8, wherein to allocate the new memory bucket, the at least one processor is further configured to:

transmit to the client a pointer to a memory address corresponding to the new memory bucket.

15. A non-transitory computer-readable device having instructions stored thereon that, when executed by at least one computing device, causes the at least one computing device to perform operations comprising:

receiving a request from a client for a memory block of a first size;

in response to the receiving, incrementing a counter corresponding to the first size, wherein the counter indicates a number of requests for a memory block of the first size;

monitoring the counter for a predetermined amount of time;

in response to the monitoring, determining that the counter exceeds a threshold corresponding to the predetermined amount of time; and in response to the determining, allocating a new memory bucket of the first size.

16. The non-transitory computer-readable device of claim 15, wherein the threshold is a percentage of total allocations during the predetermined amount of time.

17. The non-transitory computer-readable device of claim 15, the operations further comprising:

receiving a plurality of memory block requests from the client, wherein the plurality of memory block requests include requests for memory blocks of at least two different sizes;

incrementing a plurality of counters corresponding to the at least two different sizes; and storing the plurality of counters in an array with data associating the array with the client.

18. The non-transitory computer-readable device of claim 17, wherein the counter corresponding to the first size is stored in the array and the monitoring further comprises:

sampling the array for the predetermined amount of time to determine a value of the counter.

19. The non-transitory computer-readable device of claim 17, wherein the threshold is a value determined relative to the plurality of counters in the array.

20. The non-transitory computer-readable device of claim 15, the operations further comprising:

monitoring a second counter for the predetermined amount of time, wherein the second counter corresponds to a number of times a first engine corresponding to a first instance has utilized memory from a second instance;

in response to the monitoring, determining that the second counter exceeds a second threshold corresponding to the predetermined amount of time; and in response to the determining, generating a third instance having a number of buckets equal to the first instance.

* * * * *